United States Patent
Oshiro

(10) Patent No.: US 7,619,510 B2
(45) Date of Patent: Nov. 17, 2009

(54) APPARATUS, METHOD AND PROGRAM FOR ALARMING ABNORMALITY IN TIRE AIR-PRESSURE

(75) Inventor: Yuji Oshiro, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 361 days.

(21) Appl. No.: 11/607,034

(22) Filed: Dec. 1, 2006

(65) Prior Publication Data
US 2007/0139180 A1   Jun. 21, 2007

(30) Foreign Application Priority Data
Dec. 16, 2005 (JP) ............................. 2005-363210
Oct. 5, 2006 (JP) ............................. 2006-274376

(51) Int. Cl.
*B60C 23/00* (2006.01)

(52) U.S. Cl. ..................... 340/444; 340/442; 340/443; 73/146.2; 116/34 R; 702/148

(58) Field of Classification Search .............. 701/29–35
See application file for complete search history.

(56) References Cited

U.S. PATENT DOCUMENTS

| | | | |
|---|---|---|---|
| 5,721,374 A * | 2/1998 | Siekkinen et al. | 73/146.2 |
| 6,804,623 B2 * | 10/2004 | Oshiro | 702/140 |
| 6,945,102 B2 * | 9/2005 | Sugisawa | 73/146 |
| 7,502,704 B2 * | 3/2009 | Burghardt et al. | 702/98 |
| 2003/0233209 A1 | 12/2003 | Yanase | |

FOREIGN PATENT DOCUMENTS

| | | | |
|---|---|---|---|
| JP | 63-305011 A | | 12/1988 |
| JP | 6-278419 A | | 10/1994 |
| JP | 11-78442 A | | 3/1999 |
| JP | 2001-215175 A | | 8/2001 |
| JP | 2002-120528 A | | 4/2002 |
| JP | 2004-17716 A | | 1/2004 |
| JP | 2004-67009 A | | 3/2004 |
| WO | WO 2004058519 A1 * | | 7/2004 |
| WO | WO 2005063511 A1 * | | 7/2005 |

OTHER PUBLICATIONS

Mou et al.; "Introduction to Tire Pressure Monitoring System and Its Two Solutions"; Vehicle Electric Apparatus, pp. 54-56, 2005.

* cited by examiner

*Primary Examiner*—Daniel Wu
*Assistant Examiner*—Ryan W Sherwin
(74) *Attorney, Agent, or Firm*—Birch, Stewart, Kolasch & Birch, LLP

(57) ABSTRACT

The present invention provides an apparatus, method and program for alarming abnormality in tire air-pressure which prevent the issuance of an erroneous alarm and thus determine abnormality in tire air-pressure even when a rotational velocity of the tire changes by causes other than a decrease in an air pressure. An apparatus for alarming abnormality in tire air-pressure decrease detects a change in a relationship between wheel velocities of front wheel tires and those of rear wheel tires, and replaces a relationship between the wheel velocities of the front wheel tires and those of the rear wheel tires with a relationship between wheel velocities of front wheel tires and those of rear wheel tires obtained after the change of the relationship, thereby determining abnormality in air-pressure when the change is detected.

6 Claims, 3 Drawing Sheets

APPARATUS, METHOD AND PROGRAM FOR ALARMING ABNORMALITY IN TIRE AIR-PRESSURE

BACKGROUND OF THE INVENTION

The present invention relates to an apparatus, method and program for alarming abnormality in tire air-pressure.

As a method for alarming abnormality in tire air-pressure to detect decrease in tire air-pressure and issue an alarm, for example, a method for detecting whether or not a tire air-pressure is decreased due to a variation in a determinate value calculated from a rotational velocity of each tire by utilizing the fact that a rotational velocity of a tire having a decreased pressure is faster than that of a tire having a normal air-pressure, and issuing an alarm when decrease in tire air-pressure is detected, has been conventionally used (see Japanese Unexamined Patent Publication No. 305011/1988).

In the above-mentioned method, determinate values DEL (1) to (3) are calculated by the following equations, for example:

$$DEL(1) = \{(V1+V4)/2 - (V2+V3)/2\}/\{(V1+V2+V3+V4)/4\} \times 100(\%);$$

$$DEL(2) = \{(V1+V2)/2 - (V3+V4)/2\}/\{(V1+V2+V3+V4)/4\} \times 100(\%); \text{ and}$$

$$DEL(3) = \{(V1+V3)/2 - (V2+V4)/2\}/\{(V1+V2+V3+V4)/4\} \times 100(\%),$$

wherein V1 to V4 represent wheel velocities of a front left tire (FL tire), a front right tire (FR tire), a rear left tire (RL tire) and a rear right tire (RR tire), respectively in the above-mentioned equations. In a case where any one of the determinate values DEL (1) to (3) exceeds a predetermined threshold, decrease in tire air-pressure is notified to a driver.

However, in some cases where the rotational velocity of the tire changes by causes other than the decrease in the tire air-pressure, for example, in the case where a vehicle carries out long-distance traveling, so that a diameter of a tire is smaller, an alarm was issued even at a normal internal pressure.

SUMMARY OF THE INVENTION

An object of the present invention is to provide an apparatus, method and program for alarming abnormality in tire air-pressure which prevent the issuance of an erroneous alarm and determine abnormality in tire air-pressure even when a rotational velocity of the tire changes due to causes other than decrease in an air-pressure.

The present invention relates to an apparatus for alarming abnormality in tire air-pressure including means for detecting a change in a relationship between wheel velocities of front wheel tires and those of rear wheel tires, and means for replacing a relationship between the wheel velocities of the front wheel tires and those of the rear wheel tires with a relationship between wheel velocities of the front wheel tires and those of the rear wheel tires obtained after the change of the relationship, thereby determining abnormality in tire air-pressure when the change is detected in the detecting means.

In the apparatus for alarming abnormality in tire air-pressure, the relationship between the wheel velocities of the front wheel tires and those of the rear wheel tires is furthermore preferably calculated based on the wheel velocities of the front wheel tires and those of the rear wheel tires, and a torque.

Moreover, the present invention relates to a method for alarming abnormality in tire air-pressure including the step of detecting a change in a relationship between wheel velocities of the front wheel tires and those of the rear wheel tires, and the step of replacing the relationship between the wheel velocities of the front wheel tires and those of the rear wheel tires with a relationship between wheel velocities of the front wheel tires and those of the rear wheel tires obtained after the change of the relationship, thereby determining abnormality in tire air-pressure when the change is detected in the detecting step.

In the method for alarming abnormality in tire air-pressure, furthermore, the relationship between the wheel velocities of the front wheel tires and those of the rear wheel tires is preferably calculated based on the wheel velocities of the front wheel tires and those of the rear wheel tires, and a torque.

In addition, the present invention relates to a program for alarming abnormality in tire air-pressure making a computer execute a procedure of detecting a change in a relationship between wheel velocities of the front wheel tires and those of the rear wheel tires, and a procedure of replacing the relationship between the wheel velocities of the front wheel tires and those of the rear wheel tires with a relationship between wheel velocities of the front wheel tires and those of the rear wheel tires obtained after the change of that relationship, and determining abnormality in air-pressure when the change in that relationship is detected in the detecting procedure.

In the above-mentioned program for alarming abnormality in tire air-pressure according to claim 5, furthermore, the relationship between the wheel velocities of the front wheel tires and those of the rear wheel tires is furthermore preferably calculated based on the wheel velocities of the front wheel tires and those of the rear wheel tires, and a torque.

According to the present invention, it is possible to provide an apparatus, method and program for alarming abnormality in tire air-pressure which prevent the issuance of an erroneous alarm and determines abnormality in tire air-pressure by correcting a relationship between the wheel velocities of the front wheel tires and those of the rear wheel tires and replacing the relationship between the wheel velocities of the front wheel tires and those of the rear wheel tires with the relationship between wheel velocities of the front wheel tires and those of the rear wheel tires obtained after change of the relationship even when a rotational velocity of the tire changes by causes other than decrease in an air-pressure.

DETAILED DESCRIPTION

An apparatus, method and program for alarming abnormality in tire air-pressure according to the present invention will be described below on the basis of the accompanying drawings.

Figure 1:
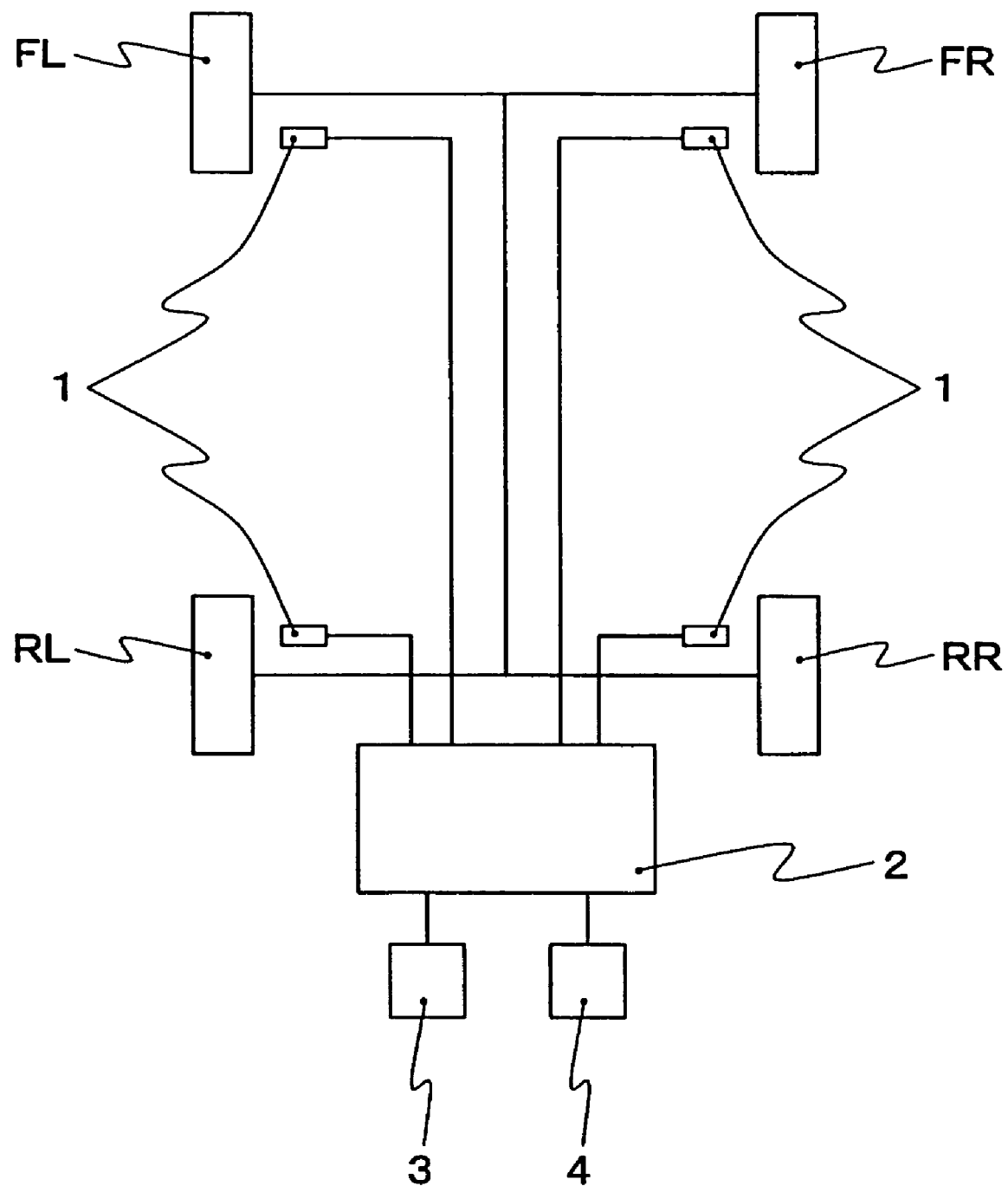
FIG. 1 is a block diagram showing one Embodiment of an apparatus for alarming abnormality in tire air-pressure according to the present invention.

FIG. 1 is a block diagram showing one Embodiment of an apparatus for alarming abnormality in tire air-pressure according to the present invention.

As shown in FIG. 1, the apparatus for alarming abnormality in tire air-pressure according to one Embodiment of the present invention detects whether air pressure of any of four tires (a front left tire (FL tire), a front right tire (FR tire), a rear left tire (RL tire) and a rear right tire (RR tire)) provided on a vehicle are decreased or not, and includes a wheel velocity sensor 1 which is conventional velocity detecting means provided with respect to each of the tires. An output of the wheel velocity sensor 1 is supplied to a control unit 2. To the control unit 2, an alarm 3 which includes such as a liquid crystal display element, plasma display element or CRT for notifying decrease in air-pressure and an initialization switch 4 which may be operated by a driver are connected.

Figure 2:
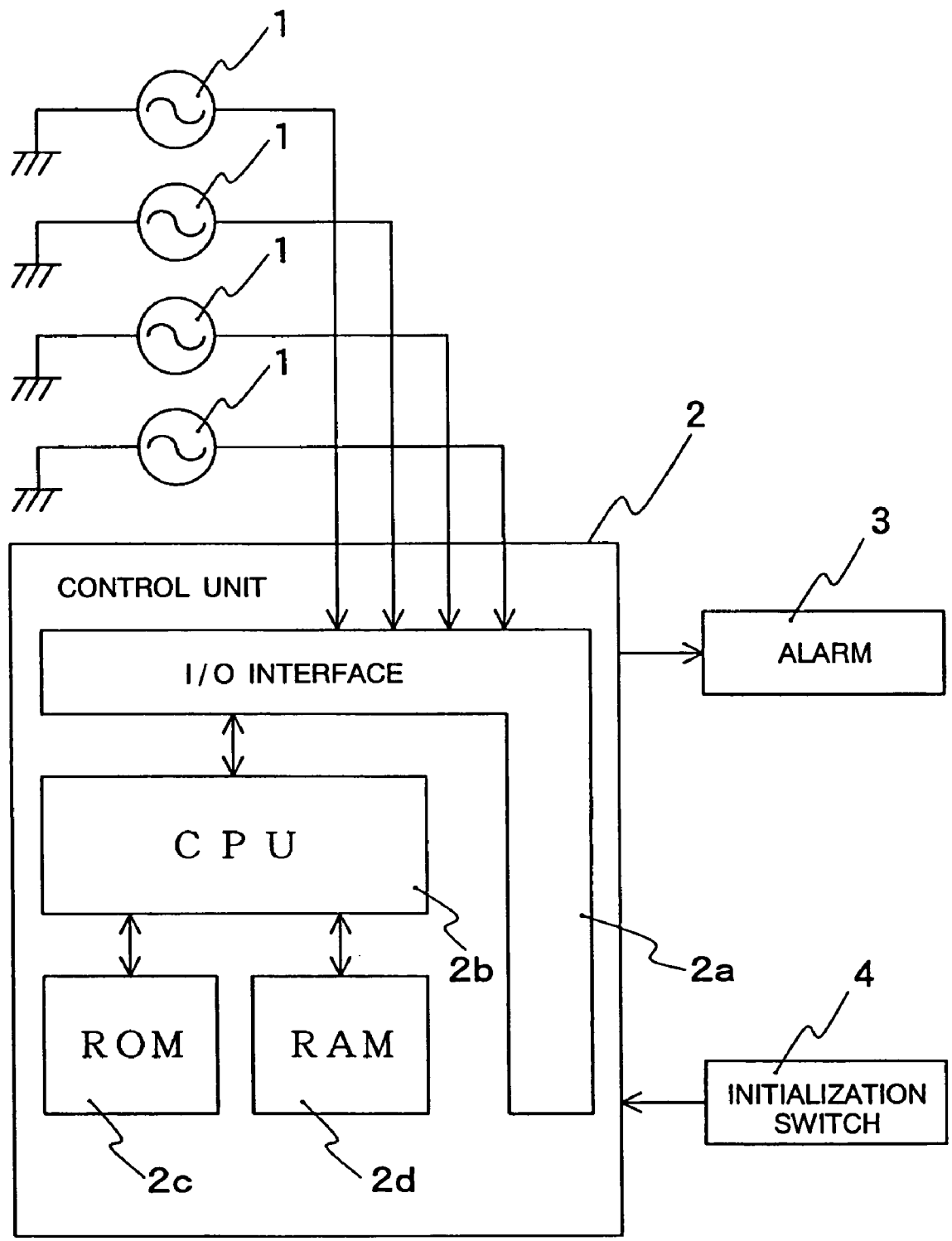
FIG. 2 is a block diagram showing an electrical configuration of an apparatus for alarming abnormality in tire air-pressure illustrated in FIG. 1.

The control unit 2 includes an I/O interface 2a which is required for sending/receiving a signal to/from an external device, a CPU 2b which functions as a center of calculation processing, a ROM 2c which stores a control operation programs for the CPU 2b, and a RAM 2d into which data is temporarily written and from which data is read out when the CPU 2b performs control operations (FIG. 2).

In the wheel velocity sensor 1, a pulse signal corresponding to the number of revolutions of a tire (hereinafter, referred to as wheel velocity pulse) is outputted. In the CPU 2b, moreover, rotational angular velocities $F_i$ ($F_1$ to $F_4$) of respective tires are calculated at specified sampling periods $\Delta T$ (sec), for example, $\Delta T=1$ second based on the basis of the wheel velocity pulses outputted from the wheel velocity sensor 1. $F_1$ to $F_4$ represent the rotational angular velocities of the FL tire, the FR tire, the RL tire and the RR tire, respectively.

Since tires are manufactured by including variations within a specification (an initial difference), effective rotational radii of respective tires (a value obtained by dividing a distance traveled by the one rotation by $2\pi$) are not necessarily identical to one another even when inner pressures of all tires are normal. For this reason, the rotational angular velocities $F_i$ of respective tires thus vary. Therefore, the corrected rotational angular velocities $F_i$ are calculated to cancel the variation due to the initial difference. Specifically, the value is corrected as follows:

$F1_1=F_1$;
$F1_2=mF_2$;
$F1_3=F_3$; and
$F1_4=nF_4$, wherein for example, under the condition that vehicle is traveling straight, rotational angular velocity $F_i$ is calculated. Based on the calculated rotational angular velocity $F_i$, the correction coefficients m and n are obtained as $m=F_1/F_2$ and $n=F_3/F_4$.

Thereafter, the rotational wheel velocity $V_i$ is calculated based on the $F1_i$ (means 1).

In the apparatus for alarming abnormality in tire air-pressure according to the present invention, a relationship between the wheel velocities of the front wheel tires and those of the rear wheel tires is, for example, represented by the following equations (A) and (B) and the relationship is not limited to these equations.

$$[\{(FL+FR)/(RL+RR)\}-1] \times 100 \quad (A)$$

$$[\{(FL+FR)-(RR+RL)\}/(FL+FR+RL+RR)] \times 200 \quad (B)$$

The relationship between the wheel velocities of the front wheel tires and those of rear wheel tires obtained by such as the equations (A) and (B) is expressed as Raw_DEL2_R (%).

The relationship between the wheel velocities of the front wheel tires and those of rear wheel tires may also be calculated based on a torque with the wheel velocities of the front wheel tires and rear wheel tires in addition to Raw_DEL2_R. For example, a linear regression equation is calculated from plotting data by setting a horizontal axis as torque and a vertical axis as Raw_DEL2_R. Herein, referring to the torque, a wheel torque can be calculated from such as an engine torque, the number of revolutions of the engine and an accelerator sensitivity.

The apparatus for alarming abnormality in tire air-pressure according to the present invention includes means for detecting a change in the relationship between the wheel velocities of the front wheel tires and those of rear wheel tires. An object of change in the means includes a relationship between the wheel velocities of the front wheel tires and those of the rear wheel tires calculated at a normal internal pressure, for example, that relationship when a new tire has been attached to the vehicle.

For example, in a case where the relationship between the wheel velocities of the front wheel tires and those of the rear wheel tires is calculated based on a relationship between Raw_DEL2_R and a torque, the above-mentioned change of the relationship between the wheel velocities of the front wheel tires and those of the rear wheel tires is detected by comparing a slope or intercept of the linear regression equation.

In a case where the change is detected, the relationship between the wheel velocities of the front wheel tires and those of the rear wheel tires before the change is replaced by that relationship obtained after the change is detected (a relationship after the change). The relationship between the wheel velocities of the front wheel tires and those of the rear wheel tires to be replaced shows the relationship which has been calculated at the normal internal pressure of the tires, whose relationship has been stored in the apparatus. In this stage, decrease in an air-pressure causes the relationship between the wheel velocities of the front wheel tires and those of the rear wheel tires to be changed. In the worst case, there is a possibility that an alarm might not be issued by the above-mentioned replacement. For this reason, the relationship between the velocities of the wheels is preferably replaced by that relationship after the change when the determination of decrease in air-pressure is not carried out.

The relationship after the change is preferably calculated through a contribution of a "normal initialization" to be generally executed by actual traveling in a case where the exchange of a tire is carried out, and an "initialization for comparison" to be executed by actual traveling in a case where certain requirements are satisfied in addition to the normal initialization.

The normal initialization indicates a normal initialization executed manually or automatically by actual traveling in a case where the exchange of the tire is carried out, and for example, the initialization is completed after traveling a short distance of 100 km from a start of the initialization.

As described above, as the normal initialization is completed after traveling the short-distance, there is a possibility that the tire might be then worn out. For this reason, even if the normal initialization is carried out, a change in the wheel velocity generated by the worn-out of the tire is not included. Therefore, an erroneous alarm is easily issued.

On the other hand, the initialization for comparison is started when certain requirements are satisfied. The certain requirements, for example, indicate that a vehicle has traveled a distance of at least 10000 km after the start of the normal initialization or that decrease in tire air-pressure is not determined at the present time.

It is preferable that the calculation of the relationship after the change should be carried out after the progress of the normal initialization and the initialization for comparison has been determined for certain time.

In the calculation of the relationship after the change, a difference in the relationship between the wheel velocities of the front and those of rear wheel tires in the normal initialization (a normal relationship), and that relationship in the initialization for comparison (a relationship for comparison) is preferably obtained to be compared with a specified threshold. In a case where the difference does not exceed the threshold, the normal relationship itself is set to be the wheel velocities of the front wheel tires and those of rear wheel tires after the change. On the other hand, in a case where the difference exceeds the threshold, it is possible to calculate the relationship after the change based on a traveling distance and a degree of progress of the initialization for comparison, for example, as shown in the following Table 1.

TABLE 1

| Traveling distance after the start of the | Result of the initialization for comparison (degree of contribution) | | |
|---|---|---|---|
| normal initialization | 15,000 km< | 30,000 km< | 45,000 km< |
| A degree of progress of the initialization for comparison | 1/3 2/3 1 | 1/3 2/3 3/3 | 2/3 3/3 3/3 | 3/3 3/3 3/3 |

For example, when the traveling distance is more than 15000 km and the degree of progress in the initialization for comparison is 1/3, the relationship after the change is obtained as a value with a result of the relationship for comparison and a result of the normal relationship contributing by 1/3 and 2/3, respectively.

In the present invention, thus, the initialization for comparison is carried out with the normal initialization so that a shift of the normal initialization caused by the worn-out of the tire can be corrected to carry out an initialization more accurately and to decrease an erroneous alarm sharply.

Figure 3:
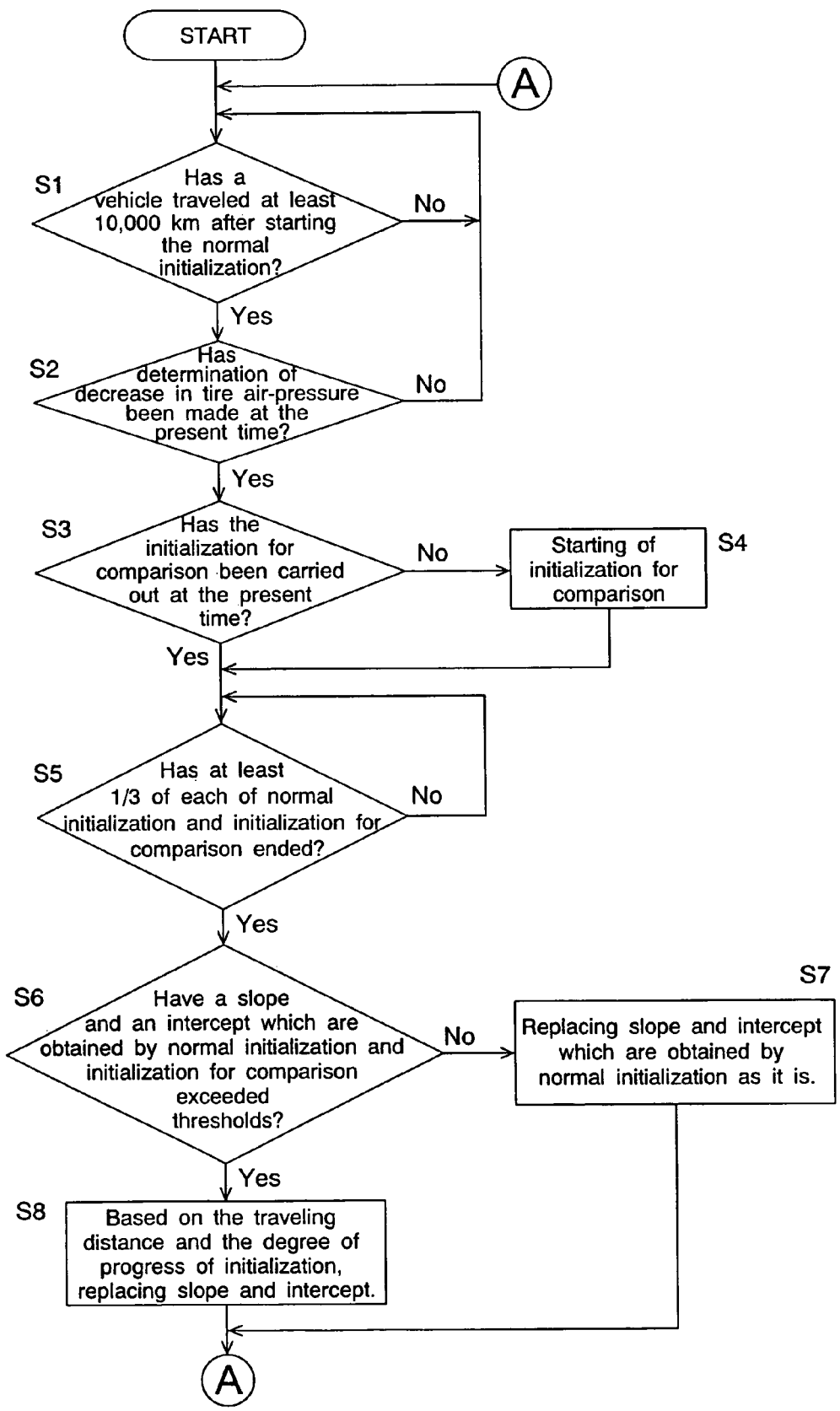
FIG. 3 is a flowchart showing an example of the Embodiment according to the present invention.

FIG. 3 is a flowchart showing an example based on the technical matters described above. The description in FIG. 3 is one of the examples and the Embodiment according to the present invention is not limited thereto.

At S1, decrease in air-pressure is determined based on whether a vehicle has traveled a distance of at least 10000 km after a start of the normal initialization. If the traveling distance after a start of the normal initialization is less than 10000 km, the step returns to the start. When the traveling distance is more than 10000 km, a routine of S2 is executed.

At S2, it is determined whether a determination of decrease in air-pressure is carried out or not. If the determination of decrease in air-pressure is not carried out, moreover, a routine of S3 is executed.

At S3, it is determined whether a process of an initialization for comparison is executed at the present time or not. If the process is not executed, the initialization for comparison is started in accordance with a routine of S4 and a routine of S5 is then executed. If the initialization for comparison has already been started, moreover, the routine of S5 is executed.

At S5, it is determined whether at least 1/3 of each of the normal initialization and the initialization for comparison are ended or not. If at least 1/3 of either the normal initialization or the initialization for comparison is not ended, the process returns to the routine of S5 again. If at least 1/3 of each of the initializations is ended, moreover, a routine of S6 is executed.

At S6, it is determined whether a difference between respective slopes and a difference between respective intercepts which are obtained by the normal initialization and the initialization for comparison exceed respective thresholds thereof or not. Here, by setting torque as a horizontal axis and Raw_DEL2_R as a vertical axis, the slope and the intercept are calculated from a linear regression equation obtained by plotting data. If the slope and the intercept do not exceed the thresholds, the slope and the intercept are replaced with a slope and an intercept obtained by the normal initialization (S7). If they exceed the thresholds, moreover, a routine of S8 is executed.

At S8, the slope and the intercept are replaced with a slope and an intercept obtained by the initialization for comparison and those new slope and intercept are stored based on the traveling distance and the degree of progress of the initialization.

EXAMPLE

While the present invention will be described in detail based on an example, it is not limited thereto.

An actual traveling test condition for confirming a performance of a method for alarming abnormality in tire air-pressure according to the present invention is shown including the test course.

(Test Condition)

Type of experimental vehicle: two-seated FF vehicle

Tire size: 185/65R15

Experimental place: Okayama Test Course of Sumitomo Rubber Industries, Ltd. and a straight course in peripheral general roads (Test Vehicle)

By using a test vehicle having a normal air pressure of tires and a brand-new tire attached thereto, the following vehicle traveling test was executed.

<Actual Vehicle Traveling Test>

(Initial Stage of Traveling)

Velocities of all four wheels and a torque were calculated after the start of the traveling operation of the test vehicle. The normal initialization was started with the start of the traveling operation.

Raw_DEL2_R was calculated from the wheel velocity thus obtained, to obtain a linear regression equation by setting Raw_DEL2_R as a vertical axis and a torque as a horizontal axis to be plotted into a graph. Thereafter, the slope and the intercept thereof were calculated and stored, respectively (a slope of 0.002 and an intercept of 0.169).

(At Long-Distance Traveling)

The slope (a slope: 0.002) and the intercept (an intercept: 0.0014) in the normal initialization and the slope (a slope: 0.0014) and the intercept (an intercept: 0.069) in the initialization for comparison at a time when a test vehicle had traveled a distance of 50000 km after the start of the traveling operation, were calculated.

A threshold of a difference between the slopes in the normal initialization and the initialization for comparison was 0.0005 and a threshold of a difference between the intercepts was 0.09. Those differences between the normal initialization and the initialization for comparison exceeded those thresholds.

Here, applying to Table 1, the normal initialization did not contribute to the calculation of the slope and the intercept at a point of 50000 km and the slope and the intercept which were stored in the initial stage of the traveling operation were replaced with the slope and the intercept which were obtained by the initialization for comparison and the values were stored.

Though several Embodiments of the present invention are described above, it is to be understood that the present invention is not limited only to the above-mentioned, various changes and modifications may be made in the invention without departing from the spirit and scope thereof.

What is claimed is:

1. An apparatus for alarming abnormality in tire air-pressure comprising:

means for determining a first relationship between wheel velocities of front wheel tires and those of rear wheel tires during a normal initialization, when travel has occurred over a first distance;

means for determining a second relationship between wheel velocities of front wheel tires and those of rear wheel tires during an initialization for comparison, when travel has occurred over a second distance that is greater than the first distance;

means for detecting a change in the relationship between wheel velocities of front wheel tires and those of rear wheel tires by comparing the first and second relationships;

means for replacing the first relationship with the second relationship when the change exceeds a predetermined threshold, thereby determining abnormality in air-pressure when the change is detected in the detecting step.

2. The apparatus for alarming abnormality in tire air-pressure according to claim 1, wherein the relationship between the wheel velocities of the front wheel tires and those of the rear wheel tires is calculated based on the wheel velocities of the front wheel tires and those of the rear wheel tires, and a torque.

3. A method for alarming abnormality in tire air-pressure comprising the steps of:

determining a first relationship between wheel velocities of front wheel tires and those of rear wheel tires during a normal initialization, when travel has occurred over a first distance;

determining a second relationship between wheel velocities of front wheel tires and those of rear wheel tires during an initialization for comparison, when travel has occurred over a second distance that is greater than the first distance;

detecting a change in the relationship between wheel velocities of front wheel tires and those of rear wheel tires by comparing the first and second relationships;

replacing the first relationship with the second relationship when the change exceeds a predetermined threshold, and thereby determining abnormality in air-pressure when the change is detected in the detecting step; and wherein the foregoing steps are carried out using a computer.

4. The method for alarming abnormality in tire air-pressure according to claim 3, wherein the relationship between the wheel velocities of the front wheel tires and those of the rear wheel tires is calculated based on the wheel velocities of the front wheel tires and those of the rear wheel tires, and a torque.

5. A program, carried in computer-readable memory, for alarming abnormality in tire air-pressure, the program, when executed, making a computer execute:

a procedure of determining a first relationship between wheel velocities of front wheel tires and those of rear wheel tires during a normal initialization, when travel has occurred over a first distance;

determining a second relationship between wheel velocities of front wheel tires and those of rear wheel tires during an initialization for comparison, when travel has occurred over a second distance that is greater than the first distance;

a procedure of detecting a change in the relationship between wheel velocities of front wheel tires and those of rear wheel tires by comparing the first and second relationships;

a procedure of replacing the first relationship with the second relationship when the change exceeds a predetermined threshold, and thereby determining abnormality in air-pressure when the change is detected in the detecting procedure.

6. The program for alarming abnormality in tire air-pressure according to claim 5, wherein the relationship between the wheel velocities of the front wheel tires and those of the rear wheel tires is calculated based on the wheel velocities of the front wheel tires and those of the rear wheel tires, and a torque.

* * * * *